(12) United States Patent
Tschöp

(10) Patent No.: US 6,571,663 B1
(45) Date of Patent: Jun. 3, 2003

(54) STEERING WHEEL FOR MOTOR VEHICLES

(75) Inventor: Winfried Tschöp, Kreuzwertheim (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/601,691

(22) PCT Filed: Feb. 12, 1999

(86) PCT No.: PCT/EP99/00924

§ 371 (c)(1),
(2), (4) Date: Aug. 7, 2000

(87) PCT Pub. No.: WO99/41131

PCT Pub. Date: Aug. 19, 1999

(30) Foreign Application Priority Data

Feb. 13, 1998 (DE) ..................... 298 02 474 U

(51) Int. Cl.$^7$ ................................. G05G 1/10
(52) U.S. Cl. ........................... 74/552; 296/189; 74/558
(58) Field of Search .................. 74/552, 558; 296/189, 296/39.1; 280/750, 751

(56) References Cited

U.S. PATENT DOCUMENTS

| 3,394,615 A | | 7/1968 | Brueder | |
|---|---|---|---|---|
| 3,493,244 A | * | 2/1970 | Bozich | 428/911 |
| 3,834,482 A | * | 9/1974 | Wada et al. | 180/90 |
| 4,386,538 A | | 6/1983 | Van Wicklin | |
| 5,590,902 A | * | 1/1997 | Eckhout | 280/728.3 |
| 5,599,043 A | * | 2/1997 | Fujita et al. | 280/750 |
| 5,649,455 A | | 7/1997 | Tsuchihashi et al. | |
| 6,126,231 A | * | 10/2000 | Suzuki et al. | 296/189 |
| 6,199,942 B1 | * | 3/2001 | Carroll et al. | 296/189 |

FOREIGN PATENT DOCUMENTS

| DE | 1479716 | | 7/1969 | |
|---|---|---|---|---|
| DE | 2129286 | | 12/1972 | |
| DE | 3433549 | A1 * | 4/1985 | 74/552 |
| EP | 0648661 | | 4/1995 | |
| GB | 2058694 | | 4/1981 | |
| GB | 2068314 | | 8/1981 | |
| GB | 2269887 | | 2/1994 | |
| WO | 10098 | | 3/1997 | |

* cited by examiner

Primary Examiner—Vinh T. Luong
(74) Attorney, Agent, or Firm—Tarolli, Sundheim, Covell & Tummino L.L.P.

(57) ABSTRACT

A carcass-free steering wheel for motor vehicles consists of a pot-shaped lower part (1) and an upper part (2) connected thereto along its edge side, both parts (1, 2) having an outer shell (3, 4) of a high-performance plastic material, which at least in the case of the lower part (1) is reinforced by webs (5, 6, 7) pointing inwards and being molded on integrally.

6 Claims, 6 Drawing Sheets

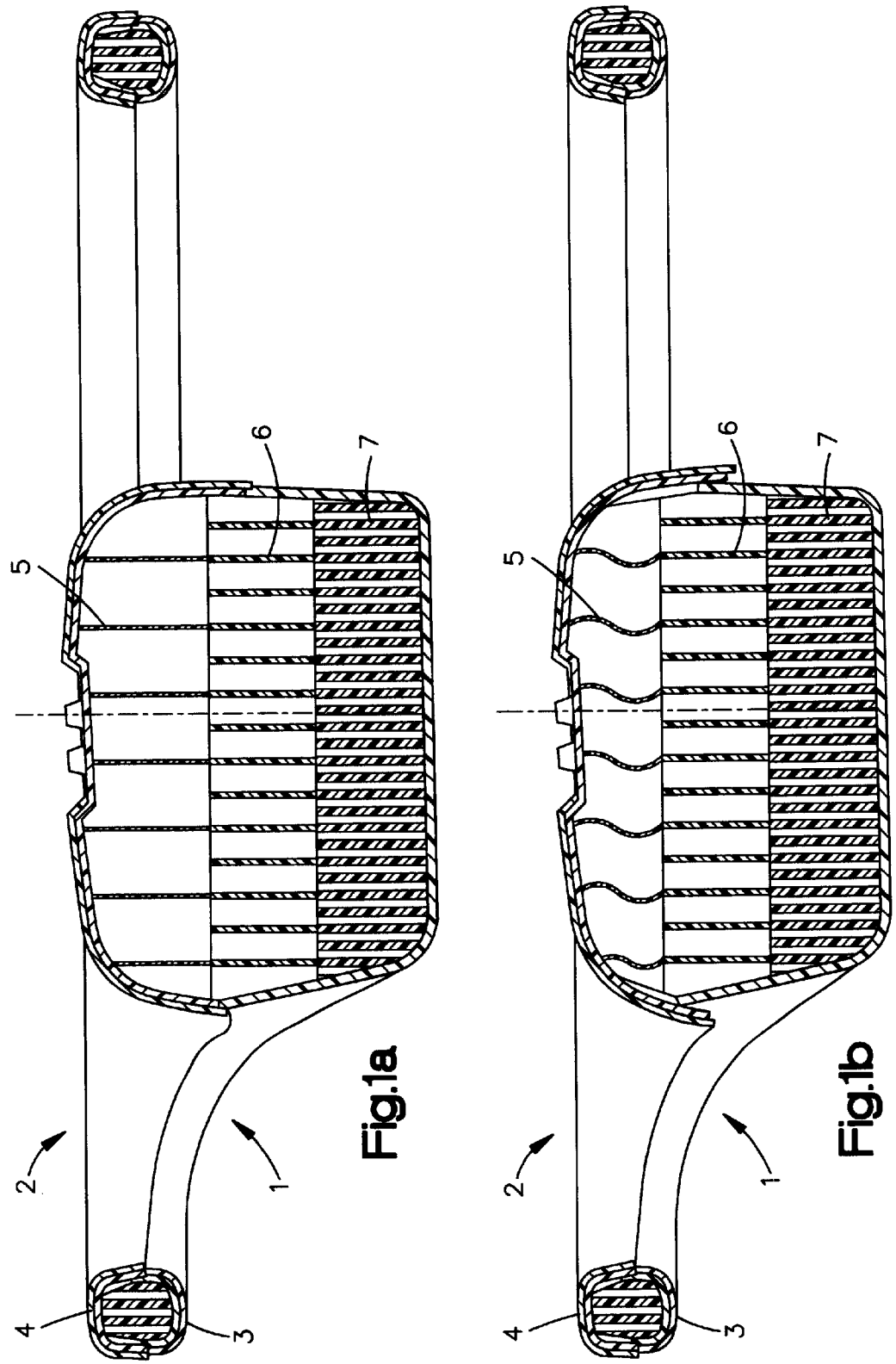

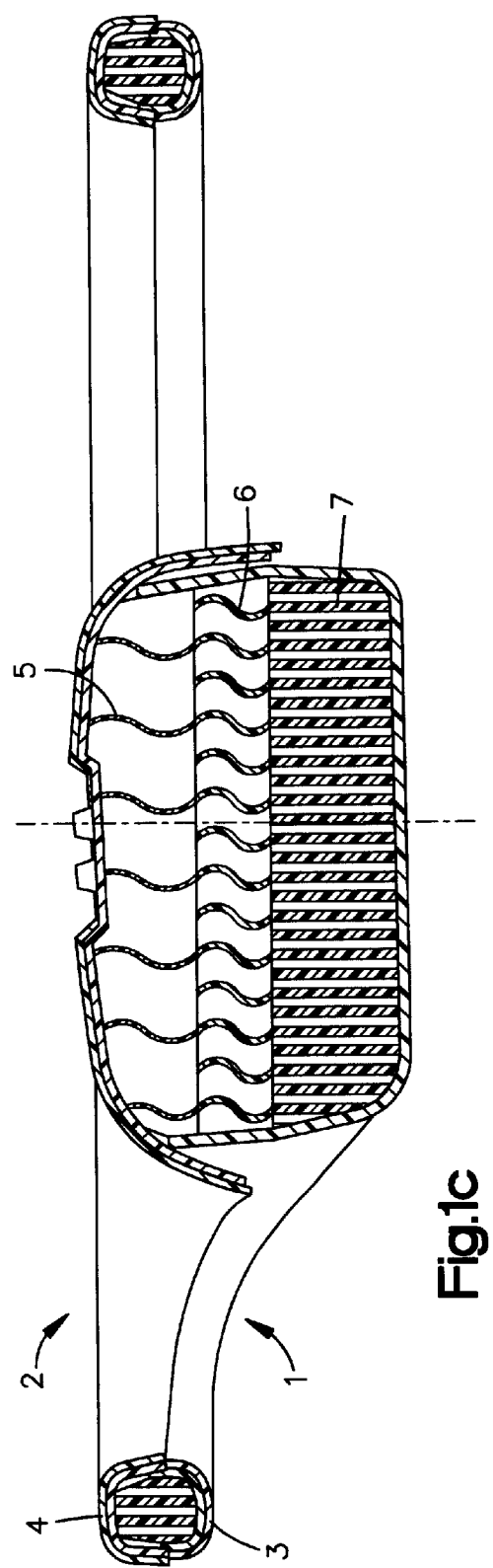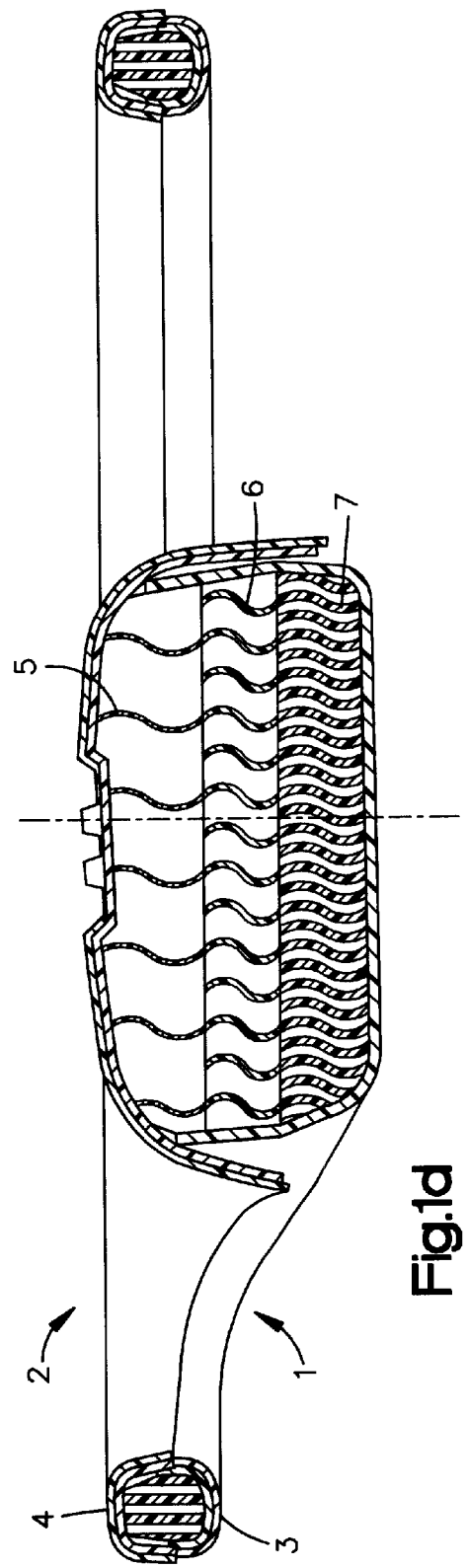

STEERING WHEEL FOR MOTOR VEHICLES

FIELD OF THE INVENTION

The invention relates to a steering wheel for motor vehicles, consisting of a pot-shaped lower part and an upper part connected thereto along its edge side, both parts having an outer shell of high-performance plastic material. Such a steering wheel is known from DE-A-21 29 286, for example.

BACKGROUND OF THE INVENTION

Steering wheels for motor vehicles consist generally of a metallic steering wheel carcass, a casing of foamed plastic material having a leather-like outer skin and an airbag housed in the steering wheel and having a cover visually and haptically adapted to the outer skin of the steering wheel. The carcass may consist of steel, aluminum, magnesium or combinations of these metals and is designed such that it can transmit all forces occurring while driving. Furthermore, today's steering wheels are often still designed in such a way that they can deform specifically during an accident when the drier strikes the steering wheel. Together with the abruptly inflating airbag the forces acting upon the casualty shall be reduced by this and injuries shall be reduced and prevented in the optimum case.

The production of such steering wheels is relatively complicated because in addition to the line for producing the metallic carcasses a second production line must be established for sheathing the carcasses with a suitable, foamable plastic material forming a tight, abrasion-resistant outer skin. If the steering wheel carcasses are made by casting, they will have to be freed from nipples or flashes before they can be inserted in the mold to be sheathed with plastics. Steering wheels which consist of prefabricated hubs, spokes and steering wheel rims require additional riveting, bolting or welding steps until a carcass ready for sheathing exists.

In addition to the expenses regarding product engineering it is considered disadvantageous in connection with conventional steering wheels that the case as such already offers a certain impact protection because the supporting steering wheel carcass is covered at least in all impact areas but does not make a contribution to the structural strength of the steering wheel. This strength has to be achieved by a corresponding cross-sectional design of the steering wheel carcass so that narrow limits are set to the general striving for weight reduction in motor vehicles even if aluminum or magnesium alloys are used.

U.S. Pat. No. 5,649,455 discloses an energy-absorbing element which is attached to a steering wheel hub and has honeycomb webs.

SUMMARY OF THE INVENTION

The object of the invention is to provide a steering wheel which enables further savings of weight without limiting its functions as regards the transmission of forces occurring while driving and as regards the impact protection.

In order to achieve this object it is proposed according to the invention that in a steering wheel of the initially mentioned kind at least the outer shell of the lower part is reinforced by webs pointing inwards and being molded on integrally, which webs plastically deform in an impact with taking up strain energy.

The invention is based on the consideration that a steering wheel carcass can be dispensed with when suitable high-performance plastic materials are used and by corresponding fashioning care is taken that said main functions can be met sufficiently. In addition, the change from carcass to shell design has the further advantage that less material expense is required to achieve certain strength values with equal materials because the supporting material can be utilized much better in terms of strength when it is disposed in the outer regions of a component. impact protection can also be obtained.

BRIEF DESCRIPTION OF THE DRAWINGS

Expedient embodiments of the inventive concept are described in the subclaims 2 to 12. Further particulars are explained in more detail by means of the embodiments shown in FIGS. 1a to 7, in which:

FIG. 1a shows a longitudinal section through a steering wheel according to the invention, FIGS. 1b–1d show various stages of steering wheel deformation in the case of a crash, FIG. 3 shows a top view of half a lower shell of a steering wheel and also shows the plane upon which FIG. 2 is taken.

DETAILED DESCRIPTION OF THE INVENTION

Figure 2:
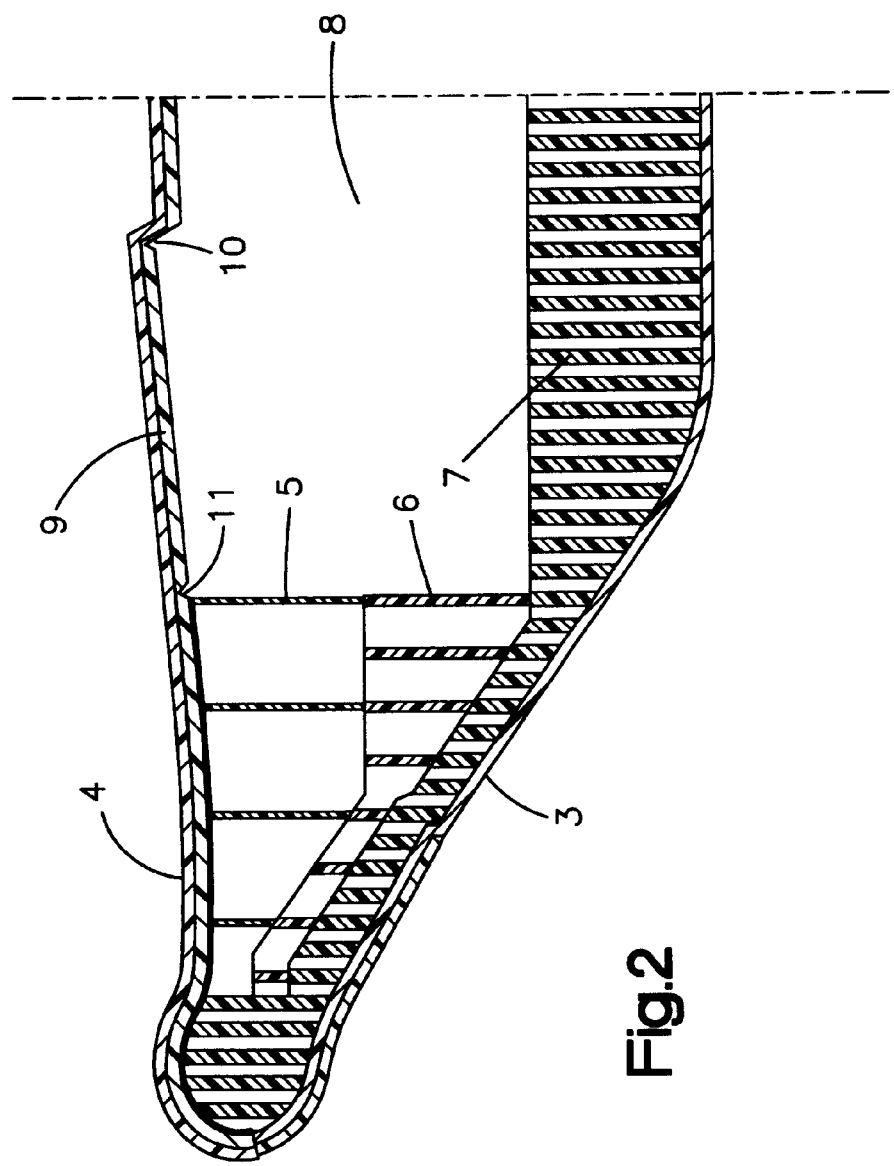
FIG. 2 shows a partial section through a steering wheel with airbag installation volume.

The steering wheel shown in section in FIG. 1a consists of a lower part 1 and an upper part 2, both parts 1, 2 having an outer shell 3, 4 of high-performance plastic material. Both parts 1, 2 are connected to each other along their edges. The lower part 1 is reinforced by integrally molded-on webs which protrude inwardly, i.e. into the space between the outer shells 3, 4. As shown, the webs 5, 6, 7 may have differing wall thicknesses and heights. The webs are preferably produced with a gradually changing deformation resistance. The upper webs 5 have a smaller wall-thickness and are arranged at a greater lateral distance than the webs 6 in the step lying underneath. The webs 7 in the lowermost step are arranged in even more confined fashion and have an even greater wall thickness. It is self-evident that instead of the three steps shown it is also possible to provide two or more than three steps and that webs can be provided which have a wall thickness constantly tapering from bottom to top. It is common practice to realize in a steering wheel impact protection a deformation resistance increasing in the impact direction.

In FIGS. 1b to 1d it is shown how the steering wheel deforms when the outer shell 4 of the upper part 2 is loaded abruptly in an accident. In the case of little load or at the beginning of greater load, the webs 5 of the uppermost layer deform first. Depending on the severeness of the crash and in the course of the crash, respectively, webs 6 and 7 of the middle step and lower step, respectively, deform as well. The outer shells 3 and 4 themselves remain substantially unchanged in this case. In particular the steering wheel carcass is not deformed because for reasons of strength it must be given a relatively high structural reinforcement by webs. FIGS. 1a to 1d do not give reference numerals because the individual parts are readily clear in synopsis with FIG. 1a and here it was only important to explain the step-wise deformation of the webs.

FIG. 2 shows how a space 8 free from webs can be provided between the outer shells 3 and 4 to accommodate an airbag module. In such cases, the outer shell 4 of the upper part 2 is, of course, equipped with a cover 9 for the airbag module which is known shall tear open along the predetermined breaking lines 10 and can swing open along hinge lines 11 when the airbag is filled abruptly with gas.

Figure 3:
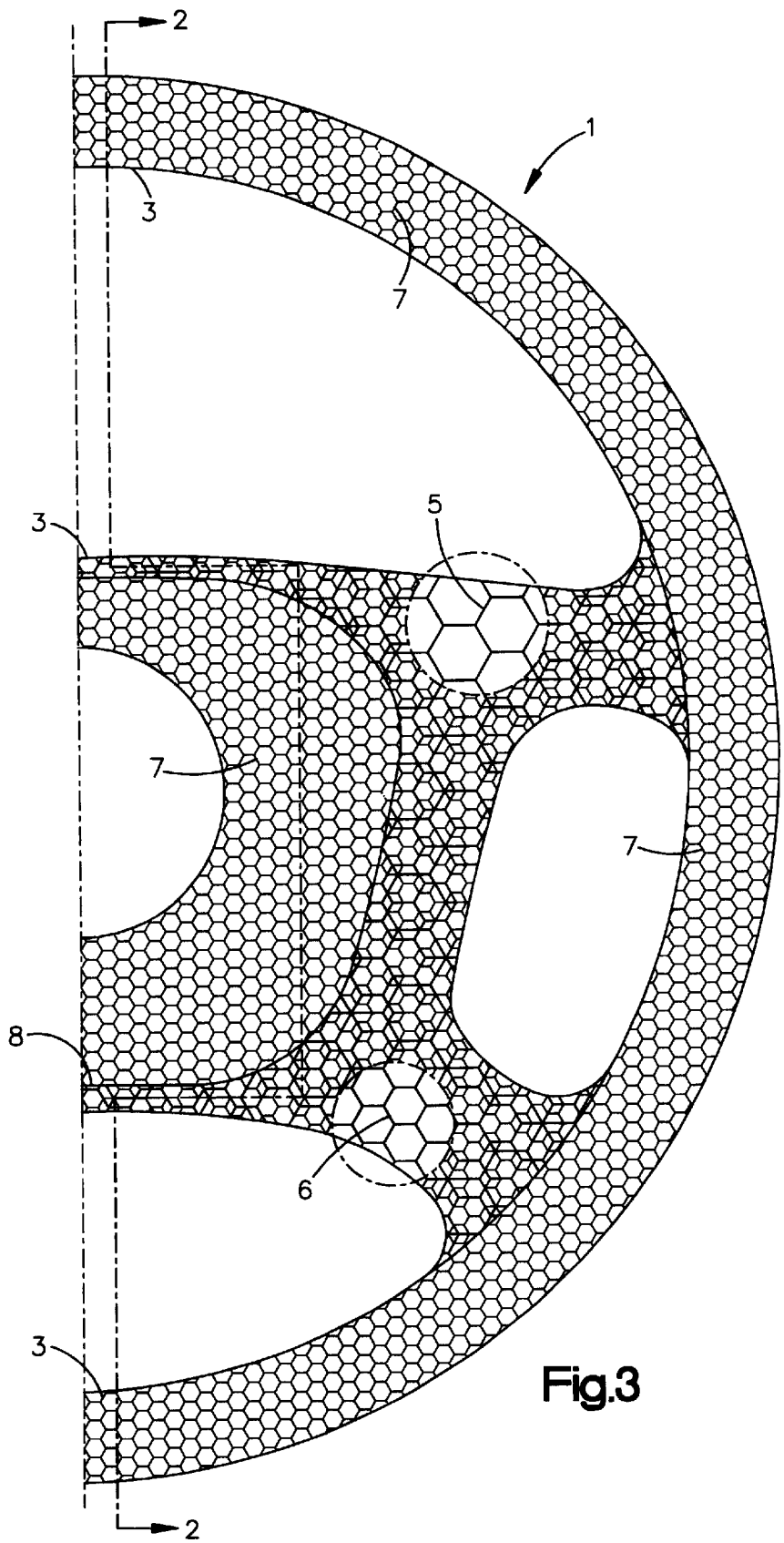

It is evident from the top view according to FIG. 3 onto half a lower part 1 for a steering wheel according to the invention how webs 5, 6 and 7 are arranged as hexagonal honeycombs. In this case, it was dispensed with to show the differing wall thicknesses of the webs 5, 6 and 7. The outer shell 3 has a first layer of webs 7 all over, which are arranged in a certain narrow distance grid. In some regions, this first layer of webs 7 is superposed by a second layer of webs 6 and a third layer of webs 5, which are also arranged as hexagonal honeycombs such that the web walls of the superposed layers coincide as much as possible so that the webs having greatest length and greatest diameter of the hexagons fit into the grid of the shorter, narrower webs of the other steps. In the middle there is again provided a space 8 which only has the webs 7 of the lowermost step but not the webs 6 and 5 of the upper steps.

Figure 5:
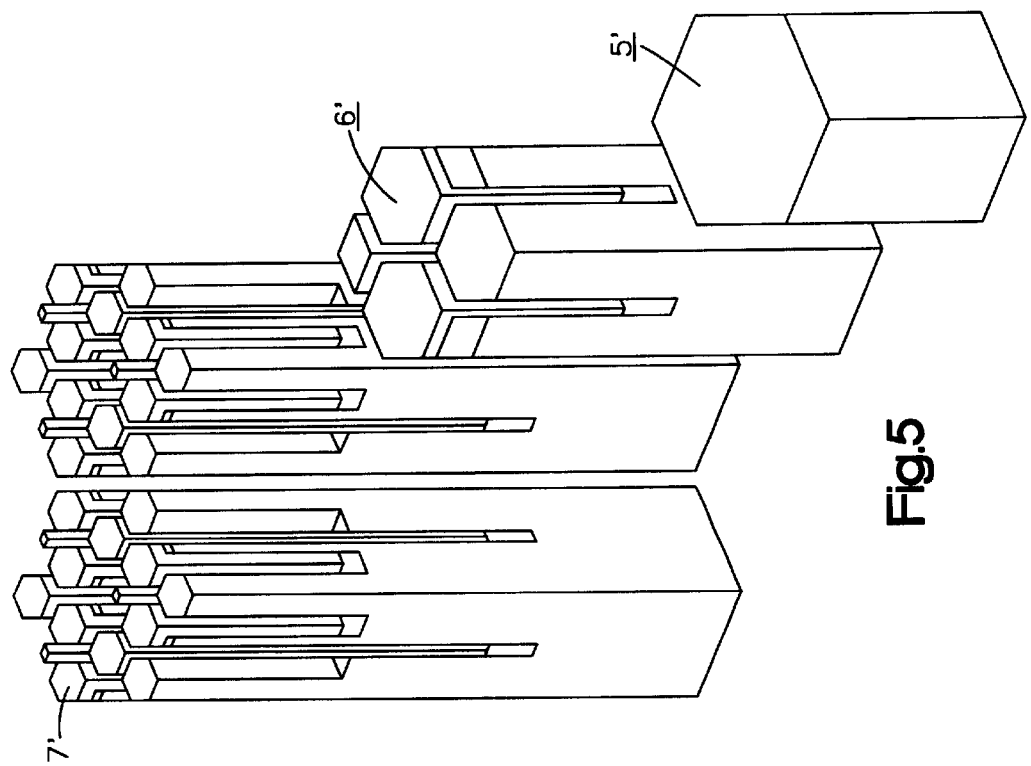
FIG. 5 shows a perspective view of part of a manufacturing mold.
Figure 4:
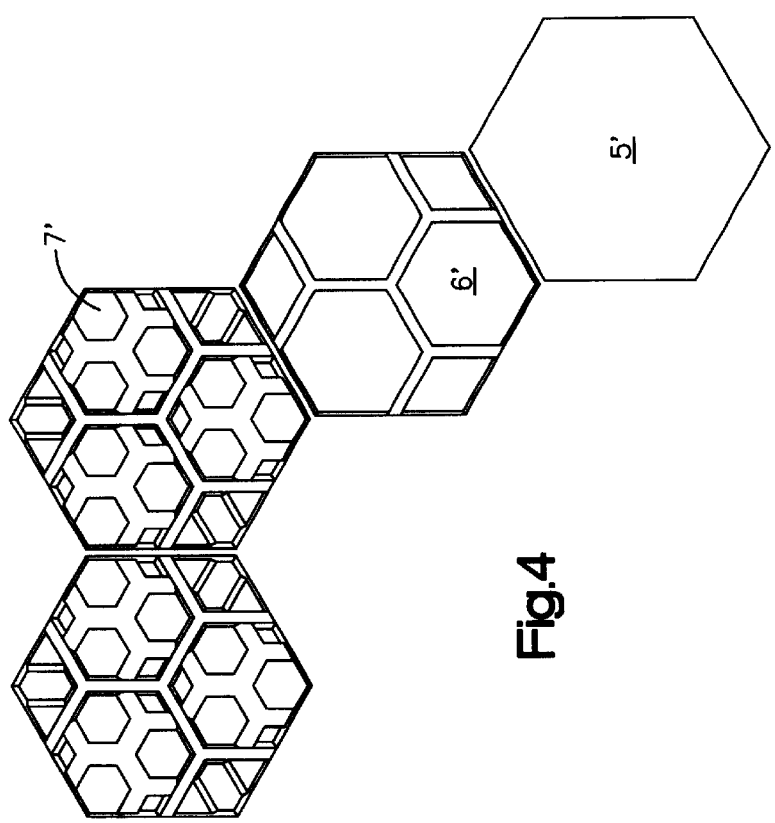
FIG. 4 shows a top view of part of the manufacturing mold.
Figure 6:
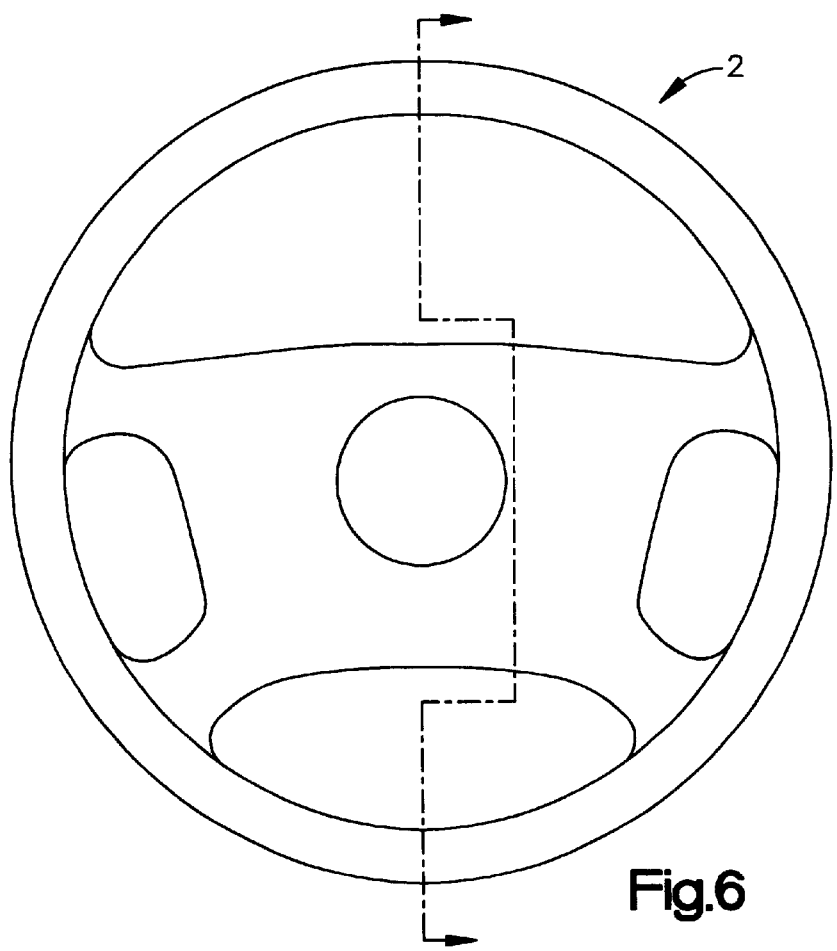
FIG. 6 shows a schematic illustration of the plane upon which the steering wheel of FIGS. 1a–2 is taken.

It is evident from FIGS. 4 and 5 how the moldings have to be designed to form a hexagonal honeycomb structure of the webs. For forming the webs 5 having the greatest grid size hexagonal moldings 5' are required, the draft required for removing from the mold also having to be taken into consideration. Likewise hexagonal moldings 6' with a corresponding draft are required for the webs 6 having a mean grid distance. Finally, hexagonal moldings 7' are superposed on these moldings 6' for forming webs 7 which are closest together. Both FIG. 4 and FIG. 5 only show part of the molding for forming the honeycomb web structure according to the invention to make comprehension easier.

Figure 7:
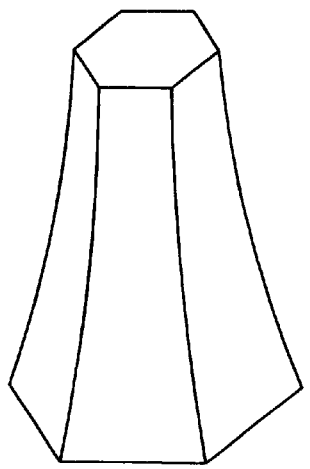
FIG. 7 shows a schematic illustration of a part of the invention.

When the inventive concept is realized, it is, of course, also possible to use other web structures. In particular, it is also conceivable to make the draft required in any case much stronger than necessary so as to create webs whose wall thickness changes constantly from bottom to top. In this way, a constantly changing deformation behavior would be obtained. FIG. 7 shows a schematic illustration of a three-dimensional view of the hexagonal webs of FIG. 3 with wall thickness constantly changing from bottom to top.

What is claimed is:

1. A steering wheel for motor vehicles,
comprising a pot-shaped lower part and an upper part, the upper and lower parts connected to each other along their edge sides,
the upper and lower parts each having an outer shell of plastic material,
at least the outer shell of the lower part being reinforced by inward pointing webs (7) integrally molded on the outer shell of the lower part,
wherein at least two layers of webs (5, 6, 7) are provided, the first layer of webs (7) being superposed by the second layer of webs (6),
the webs (5, 6, 7) plastically deforming in an impact and taking up strain energy.

2. The steering wheel according to claim 1, wherein a space is provided between the upper part and the (5, 6, 7) webs to accommodate an airbag module.

3. A steering wheel for motor vehicles,
comprising a pot-shaped lower part and an upper art, the upper and lower parts connected to each other along their edge sides,
the upper and lower parts each having an outer shell of plastic material,
at least the outer shell of the lower part being reinforced by inward pointing webs (7) integrally molded on the outer shell of the lower part,
wherein webs (5, 6, 7) are provided in the steering wheel rim and the outer shells of the upper and lower parts cover all of the webs (5, 6, 7).

4. A steering wheel for motor vehicles,
comprising a pot-shaped lower part and an upper part, the upper and lower parts connected to each other along their edge sides,
the upper and lower parts each having an outer shell of plastic material,
at least the outer shell of the lower part being reinforced by inward pointing webs integrally molded on the outer shell of the lower part,
the outer shell of the upper part being equipped with a cover for an air bag module,
the cover having breaking lines and hinge lines to enable the cover to swing open along the hinge lines.

5. A steering wheel for a motor vehicle, the steering wheel comprising:
a first part having an outer surface and an inner surface located opposite the outer surface, and
a pot-shaped second part having an inner surface for facing the inner surface of the first part and an outer surface located opposite the inner surface and for facing in the direction opposite the first part, the second part including a first circumferential edge open in the direction towards the first part,
the first part including a second circumferential edge open in the direction towards the second part,
the first and second parts being connected to each other along the first and second circumferential edges,
the outer surfaces of the first and second parts being shells of plastic material,
at least the outer shell of the second part being reinforced by webs (7) pointing to the first part, the webs (7) being integrally molded on the inner surface of the shell of the second part, and
the first and second parts forming a steering wheel rim and the outer shells of the first and second parts covering the webs (5, 6, 7) entirely so that the webs (5, 6, 7) are unseen.

6. A steering wheel for a motor vehicle, the steering wheel comprising:
a first part having an outer surface and an inner surface located opposite the outer surface, and
a pot-shaped second part having an inner surface for facing the inner surface of the first part and an outer surface located opposite the inner surface and for facing in the direction opposite the first part, the second part including a first circumferential edge open in the direction towards the first part,
the first part including a second circumferential edge open in the direction opposite the second part,
the first and second parts being connected to each other along the first and second circumferential edges, the outer surfaces of the first and second parts being shells of plastic material, at least the outer shell of the second part being reinforced by webs pointing in the direction towards the first part, the webs being integrally molded on the inner surface of the shell of the second part, and the outer shell of the first part being equipped with a cover for covering an air bag module, the cover having breaking lines and hinges to enable the cover to open along the hinges.

* * * * *